United States Patent
Files et al.

(10) Patent No.: US 12,436,578 B2
(45) Date of Patent: Oct. 7, 2025

(54) INFORMATION HANDLING SYSTEM SPEAKER MAGNET TO HOLD HOUSING PORTIONS IN A CLOSED POSITION

(71) Applicant: Dell Products L.P., Round Rock, TX (US)

(72) Inventors: Jace W. Files, Round Rock, TX (US); John Trevor Morrison, Round Rock, TX (US); Chiu-Jung Tsen, Zhubei (TW); Shawn Paul Hoss, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 18/384,456

(22) Filed: Oct. 27, 2023

(65) Prior Publication Data
US 2025/0138595 A1    May 1, 2025

(51) Int. Cl.
*G06F 1/16* (2006.01)
*G01R 33/07* (2006.01)
*G06F 3/16* (2006.01)

(52) U.S. Cl.
CPC ........... *G06F 1/1688* (2013.01); *G01R 33/07* (2013.01); *G06F 1/1616* (2013.01); *G06F 3/165* (2013.01)

(58) Field of Classification Search
CPC ..................................................... G01R 33/07
See application file for complete search history.

(56) References Cited

U.S. PATENT DOCUMENTS

| | | | |
|---|---|---|---|
| 5,860,015 A | 1/1999 | Olson | |
| 5,966,284 A | 10/1999 | Youn et al. | |
| 6,449,142 B1 | 9/2002 | Wu | |
| 8,422,212 B2 | 4/2013 | Liu et al. | |
| 8,634,873 B2 | 1/2014 | Jones et al. | |
| 8,917,501 B2 | 12/2014 | Hokugou et al. | |
| 9,274,565 B2 | 3/2016 | Tanaka | |
| 9,494,976 B2 | 11/2016 | Bates et al. | |
| 9,507,385 B2 | 11/2016 | Chen et al. | |
| 10,955,494 B2 * | 3/2021 | Renda | G06F 1/1684 |
| 11,346,902 B2 * | 5/2022 | Renda | G06F 1/3215 |
| 11,726,151 B2 * | 8/2023 | Renda | G06F 1/1684 324/252 |
| 12,306,618 B2 * | 5/2025 | Morrison | G06Q 10/08 |
| 2004/0012509 A1 | 1/2004 | Chen | |
| 2004/0190239 A1 | 9/2004 | Weng et al. | |

(Continued)

OTHER PUBLICATIONS

U.S. Appl. No. 18/081,061, filed Dec. 14, 2022, entitled "Information Handling System Keyboard Support With Rail Guide Structure Assembly to a Housing Rail," by inventors John Trevor Morrison et al.

*Primary Examiner* — Lisa Lea-Edmonds
(74) *Attorney, Agent, or Firm* — Zagorin Cave LLP; Robert W. Holland

(57) ABSTRACT

A portable information handling system housing biases to the closed position by attracting a piece of ferromagnetic material disposed in a lid housing portion to a magnet in a speaker disposed in a main housing portion. A Hall sensor proximate the ferromagnetic material detects the speaker magnet in the closed position and communicates open or closed position detection through a flexible cable and hinge to an embedded controller in the main housing for execution of logic associated with open and closed positions, such as ACPI sleep and wake states.

20 Claims, 6 Drawing Sheets

(56) References Cited

U.S. PATENT DOCUMENTS

| | | |
|---|---|---|
| 2005/0184970 A1 | 8/2005 | Wegert et al. |
| 2008/0019085 A1 | 1/2008 | Nakajima |
| 2008/0174458 A1 | 7/2008 | Mundt et al. |
| 2010/0092196 A1 | 4/2010 | Mimura |
| 2010/0149741 A1 | 6/2010 | Liu |
| 2010/0300159 A1 | 12/2010 | Berg et al. |
| 2013/0222993 A1 | 8/2013 | Iizuka |
| 2013/0286561 A1 | 10/2013 | Hokugou et al. |
| 2013/0308261 A1 | 11/2013 | Matsumoto et al. |
| 2014/0204519 A1 | 7/2014 | Wu |
| 2014/0204520 A1 | 7/2014 | Wu et al. |
| 2014/0355193 A1 | 12/2014 | Purcocks |
| 2015/0189962 A1 | 7/2015 | Yeo et al. |
| 2016/0011627 A1 | 1/2016 | Lin |
| 2016/0231788 A1 | 8/2016 | Chen et al. |
| 2019/0302852 A1 | 10/2019 | Kitamura et al. |
| 2020/0096579 A1* | 3/2020 | Renda ................. G01R 33/09 |
| 2020/0333852 A1 | 10/2020 | Smith et al. |
| 2020/0348745 A1 | 11/2020 | Hamlin et al. |
| 2021/0165059 A1* | 6/2021 | Renda ................. G06F 1/3215 |
| 2021/0223825 A1 | 7/2021 | Seiler et al. |
| 2022/0252682 A1* | 8/2022 | Renda ................. G06F 1/1688 |
| 2023/0011184 A1* | 1/2023 | Choi ................... H04R 1/345 |
| 2023/0185291 A1 | 6/2023 | Morrison et al. |
| 2025/0138595 A1* | 5/2025 | Files ................... G06F 1/1677 |
| 2025/0138596 A1* | 5/2025 | Files ................... G06F 1/1616 |
| 2025/0138597 A1* | 5/2025 | Files ................... G06F 1/1677 |

* cited by examiner

INFORMATION HANDLING SYSTEM SPEAKER MAGNET TO HOLD HOUSING PORTIONS IN A CLOSED POSITION

BACKGROUND OF THE INVENTION

Field of the Invention

The present invention relates in general to the field of portable information handling systems, and more particularly to an information handling system speaker magnet to hold housing portions in a closed position.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Information handling systems generally have a stationary or portable configuration. Stationary configurations include desktop and server systems that typically operate in a fixed location with external power and peripherals. Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Portable information handling systems also operate with peripheral devices, particularly when the end user is in an office or home environment.

Recently, increased reliance on work from home and improvements in processing, storage and networking capabilities for portable information handling systems have resulted in a greater use of portable information systems for personal and enterprise usage scenarios. Mobile use scenarios can result in greater wear and tear on portable information handling systems with large variances in expected life depending on how and where the systems are used. In some situations, batteries, displays and keyboards integrated in portable information handling systems experience little use, such as when the systems are used with a dock and external peripherals, while in other situations these components are used extensively, such as when the systems are used in mobile scenarios. When a portable information handling system fails due to a component failure, many of the remaining components have substantial useable life. Repairing a portable information handling system by replacing failed components helps to reduce commitment of functional components to landfills, to reduce system costs and to reduce environmental impacts. In some instances, the remaining components have experienced variable use so that the remaining life of the repaired system is uncertain and repairing with new components can be inefficient and cost prohibitive. An alternative is to harvest components from a failed information handling system, test the components for remaining life, and then reuse components where justified. Unfortunately, the expense of breaking down information handling systems, testing the components and rebuilding the information handling systems can often prove prohibitive.

One difficulty with reuse of information handling system components is the tracking of remaining life and predicting of future failures. Another difficulty is tearing down the information handling systems to separate out reusable components and then reassembling the components into refurbished or repaired information handling systems. Although reuse of components seems environmentally friendly on a superficial level, the true environmental cost can include a variety of factors related to the manufacture of the components, operational management of manufacturing activities and transportation logistics. One component that tends to wear in portable information handling systems is the hinge that rotationally couples the main housing portion to the lid housing portion. Over time, rotation of the housing portions can wear out the torque engine and other friction parts that help to rotate the housing in an expected manner. Although hinge movement can be tracked to estimate remaining hinge life, the actual wear cannot be readily evaluated without breaking down the information handling system. Even when a given hinge has life remaining, the hinge must match the type of hinge and torque specifications of a replacement housing, which can vary depending upon the system weight and components. Other components have similar wear over time that is difficult to evaluate, such as keyboards key condition, key annotation, and backlights. Battery useful life remaining is also tracked by use at the system, such as with a battery management unit (BMU), however, a battery can suffer physical deformations that can make the battery unusable, such as battery swell.

Another difficulty is that portable information handling systems often include expensive components that are difficult to access and reuse or recycle. One example of this is rare earth elements, such as magnets, which tend to have powerful magnetic fields. Rare earth elements are generally associated with higher carbon footprints due to mining and increased costs. Generally, information handling systems tend to have a friendlier carbon footprint and reduced environmental impact when the amount of rare earth elements is reduced and when the components that use rare earth elements are more readily reused and recycled.

SUMMARY OF THE INVENTION

Therefore, a need has arisen for a system and method which reduces the amount of rare earth elements in an information handling system and improves the reuse and/or recycling of rare earth elements.

In accordance with the present invention, a system and method are provided which substantially reduce the disadvantages and problems associated with previous methods and systems for including speakers with magnets in information handling system housings. A standardized speaker format to fit in information handling system housings of different capabilities and sizes encourages reuse of speakers at information handling system end of life. Placement of the speakers in a housing main portion aligned with ferromagnetic material in a housing lid portion leverages the speaker magnet to also hold the information handling system in a closed position. A sensor disposed in the housing lid portion detects the speaker magnet to leverage the speaker magnet for closed position detection.

More specifically, a portable information handling system processes information with processing components disposed in a portable housing having a lid portion rotationally coupled to a main portion to rotate between open and closed positions. For example, a processor executes instructions to process information in cooperation with a memory that stores the information and instructions. An audio subsystem interfaced with the processor presents information as audible sounds by converting the information to audio signals played at a speaker by communicating the signals through a coil at a magnet to vibrate a diaphragm. The speaker fits in a speaker mount of the information handling system with standardized electrical contacts and mounting positions, and then the audio subsystems characterizes the speaker coil to identify the speaker type, such as by determining the coil resistance and impedance. Once the speaker is identified, the audio subsystem applies configuration settings associated with the speaker to generate sounds from audio information. The standardized speakers have a defined speaker magnet position that is leveraged to bias the housing to a closed position with a ferromagnetic material in the housing lid portion. In addition, the closed position is detected by a Hall sensor proximate the ferromagnetic material and interfaced with an embedded controller to support closed and open position detection and logic.

The present invention provides a number of important technical advantages. One example of an important technical advantage is that a variety of information handling system platforms accept a variety of speaker types having standardized formats for footprint and electrical connections to fit in a standardized speaker mount. The audio subsystem automates speaker type detection by characterizing the speaker coil resistance and impedance to compare against available speaker types in a table associated with resistance and impedance. Once the speaker type is detected, audio subsystem settings are configured for the speaker type, such as adjusting the gain of audio signals to provide optimal sound output. A microphone of the information handling system captures audible sounds to compare against expected sounds for the speaker type and to help identify the speaker type. The standardized speaker format provides a defined position for a magnet of the speaker so that a ferromagnetic material aligned in a housing lid portion with the speaker magnet biases the housing to a closed position and a Hall sensor aligned with the speaker magnet detects the closed position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A speaker disposed in an information handling system main portion is typed by coil and magnet characteristics, and the magnet is leveraged to support biasing the housing to a closed position and detecting the housing as in a closed or open position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
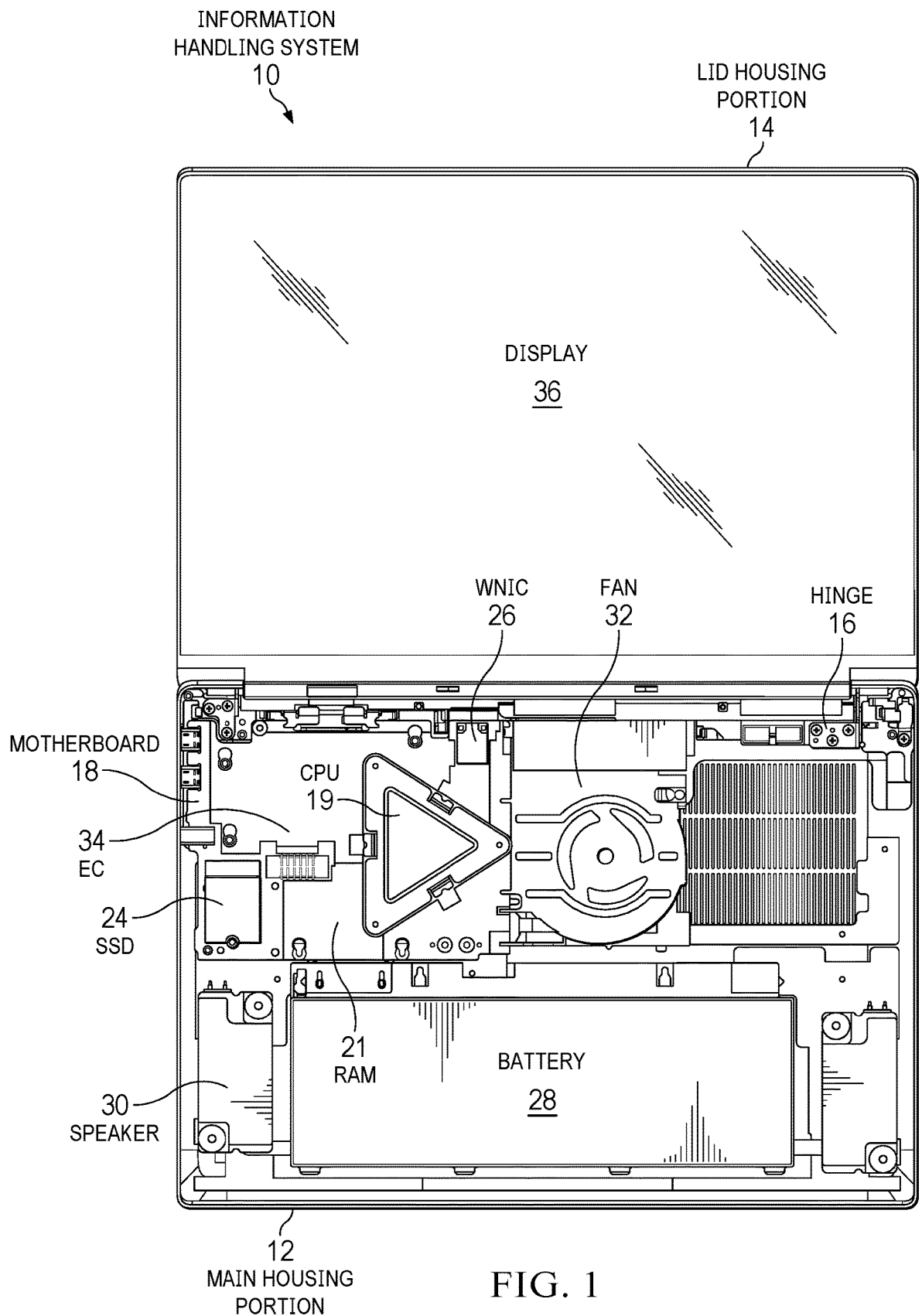
FIG. 1 depicts a portable information handling system that is configured to break down for reuse and recycling of a speaker by automatically typing the speaker when installed in the system.

Referring now to FIG. 1, a portable information handling system 10 is depicted that is configured to break down for reuse and recycling of a speaker 30 by automatically typing the speaker when installed in the system. Information handling system 10 processes information with processing components disposed in main housing portion 12 that communicate through wirelines of motherboard 18. In the example embodiment, a central processing unit (CPU) 19 executes instructions to process information in cooperation with a random access memory (RAM) 21 that stores the information and instructions. A solid state drive (SSD) 24 provides persistent storage during power down, such as with flash integrated circuits. A wireless network interface controller (WNIC) 26 provides wireless signal communications with peripheral devices and networks A battery 28 stores power to run the processing components when external power is not available. Speakers 30 generate audible sounds for audio information. A cooling fan 32 generates an active cooling airflow that cools the processing components. An embedded controller 34 has an associated flash memory and a processing resource that manages operating conditions within the system, such as application of power, internal thermal conditions and interactions with peripheral devices. Lid housing portion 14 rotationally couples to main housing portion 12 by a hinge 16 to rotate between open and closed positions. A display 36 couples to lid housing portion 14 and interfaces with motherboard 18 to present the information as visual images. As an example, portable information handling system 10 has the features described in U.S. patent application Ser. No. 18/081,061, entitled "Information Handling System Keyboard Support with Rail Guide Structure Assembly to a Housing Rail," by Morrison et al., filed on Dec. 14, 2022, and incorporated herein as if fully set forth.

In the example embodiment, hinge 16 includes a number of features that aid in the assembly, breakdown and reuse of information handling system 10. A modular design of hinge 16 separates each hinge into a fastening portion that couples to a portable housing and a rotational portion that wears over time due to rotation of the information handling system housing portions. The mounting fastening portions couple in a removeable fashion so that a hinge mount can be removed from a housing and reused in a different housing, such as with a wire bundle mounting arrangement. The rotational hinge core fits into the mount and includes a selectable set of characteristics that include torque, rotational detent orientation and rotational stop orientation. This arrangement allows any housing of any footprint to accept a common hinge mount and then configure with a selectable set of characteristics by selection of a hinge core. At end of life for an information handling system, a hinge mount is readily reused since the lack of moving parts reduces wear and the mount fits hinge cores with a wide variety of characteristics. The hinge core breaks down so that friction parts and rotating parts are readily replaced to reuse hinge core parts while worn parts are recycled. In addition, a hinge stop release within the hinge core is accessible from an exterior of an assembled information handling system housing so that the hinge fully rotates to support disassembly of the system, such as release of a display panel from the housing lid and release of a keyboard assembly from the housing main portion. Greater details regarding the example hinge are described in U.S. patent application Ser. No. 18/376,589, entitled "Modular Portable Information Handling System Hinge with Quick Attachment and Detachment," and filed on Oct. 4, 2023 by Sanchez et al., which is incorporated herein as if fully set forth. To improve reuse and recycling of the hinge and other components, such as a keyboard, evaluation of component status before breakdown of information handling system 10 is performed with telemetry by a camera visual scan of the system and automated handling, such as a robotic manipulation of information handling systems returned from end users to a remanufacture location, as is described in "Information Handling System Battery Swell Detection by Cover Deck Stress," filed on Oct. 17, 2023 by Files et al., which is incorporated herein as if fully set forth.

Rare earth elements, such as magnets, present a desirable reuse and recycling target due to their expense and high carbon footprint. The present disclosure improves reuse of rare earth elements in speakers by leveraging speakers in a standardized form factor for use in different sized platforms with different sound quality. Speaker characteristics are determined at the information handling system to configure audio settings in an automated manner. The speakers are readily interchanged between different platforms to fit in speaker mounts with common footprints, such as a common size, mounting points and electrical contacts. This allows returned systems to reuse the speakers across a greater range of replacement systems that automatically self-configure when a new speaker is detected. Further, the common location of the speaker within the housing main portion allows leverage of the speaker magnet to support other functions, such as biasing the housing to a closed position and detecting the closed position.

Figure 2:
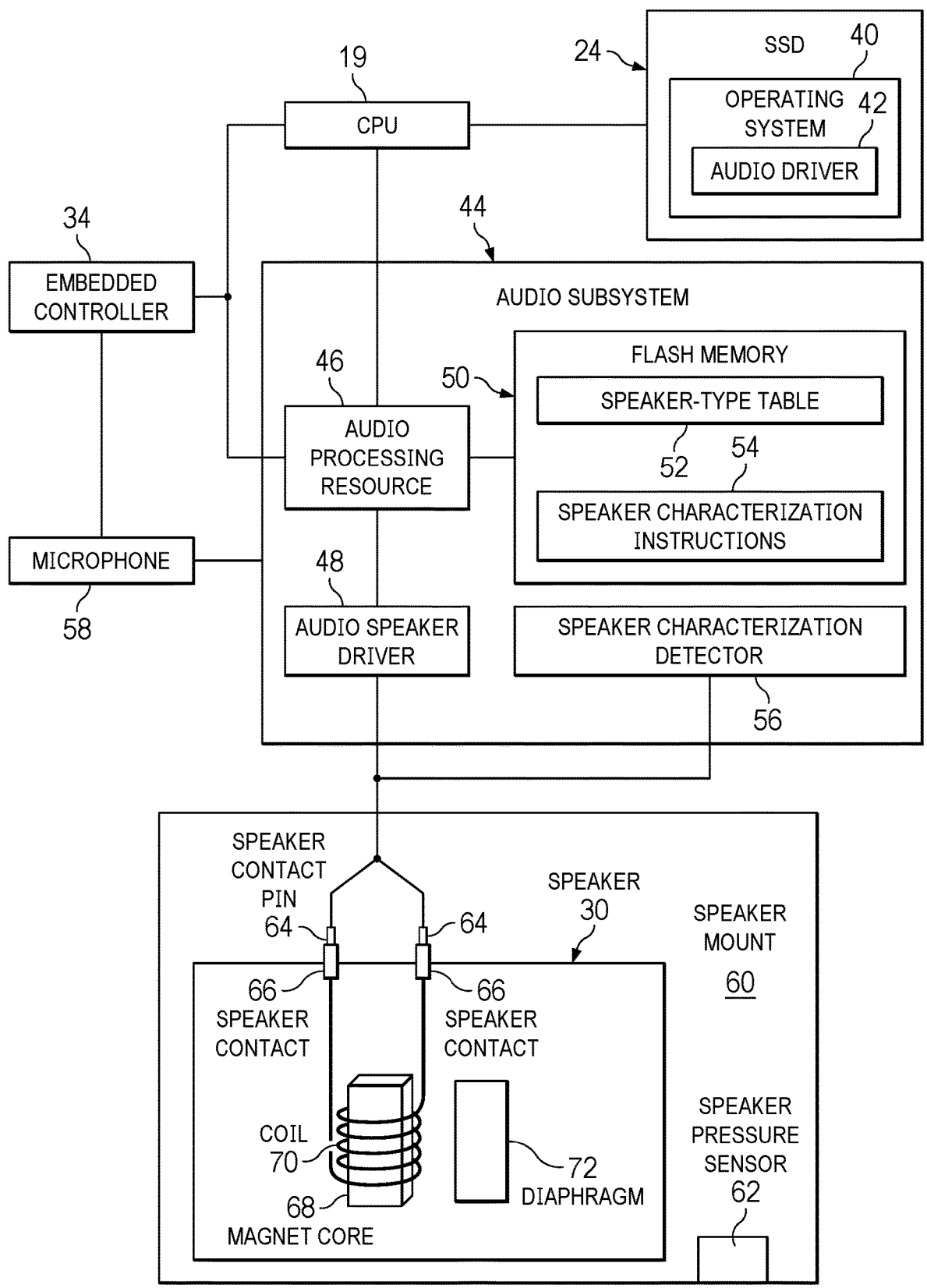
FIG. 2 depicts a block diagram of a system that types a speaker coupled to a speaker mount of an information handling system to adjust audio speaker driver settings.

Referring now to FIG. 2, a block diagram depicts a system that types a speaker 30 coupled to a speaker mount 60 of an information handling system to adjust audio speaker driver 48 settings. Speaker 30 has a conventional construction that generates sounds with a current sent through a coil 70 around a magnet 68 so that the interaction of magnetic fields by the coil and magnet introduce vibration to a diaphragm 72 to create sound. A pair of speaker contacts 66 receive a positive and negative signal from a pair of speaker contact pins 64 where the signal has a current with an irregular waveform that corresponds to the desired sound output in pitch and volume. To achieve an interchangeable speaker 30 that will fit into plural platforms of different sizes and different audio capabilities, speaker 30 has a standardized size, footprint and electrical contacts to fit in speaker mount 60 of plural different-sized information handling system platforms, such as 15 and 17 inch portable housings. A speaker presence sensor 62 detects the installation of the speaker and detects removal of the speaker so that any replacement of the speaker results in an automated reconfiguration of the audio speaker driver 48 settings to adapt to a newly installed speaker. For instance, speaker presence sensor 62 trips a switch when a speaker is removed with power on or off and then resets the switch when power is on and the speaker configuration logic is performed. This automation interface supports a wide variety of different speaker types that can fit in speaker mount 60 and interact with the information handling system processing components to generate audible sound.

The audio characteristics of speaker 30 depend upon the size of the coil, magnet and diaphragm, and the internal electronic components that manage signal current transmission across coil 70, such as capacitors, resistors and/or inductors. When audio speaker driver 48 generates a current signal, the type of signal depends upon the type of speaker being driven. A high quality speaker will typically handle larger currents and more substantial current swings to generate sound without noise, while the same currents applied to a lower quality speaker might not just generate excessive noise but also blow the speaker circuits. Thus, in order to make speaker 30 interchangeable between multiple information handling system platforms and intelligently configure the information handling systems to drive each type of speaker, audio subsystem 44 of the information handling system characterizes the type of coil 70 of a speaker 30 when a new speaker installation is detected and uses the coil characterization to identify the speaker and look up audio speaker driver settings for driving the speaker. Coil 70 is characterized by energizing the coil and measuring the coil's response. For instance, impedance of the speaker is measured with a frequency-based signal, such as a Sine wave signal, and resistance of the speaker is measured with a direct current (DC) signal to determine current drop from the positive to negative contact. In addition, the speaker is characterized by applying a known signal of a test sound and measuring with a microphone the audible sound produced by the speaker in response to the test sound. Based upon these characterizations, the installed speaker is typed and identified to configure audio driver settings accordingly. Thus, 16 and 13 inch information handling systems can each handle the same speaker and offer different sound qualities where an audio subsystem 44 can adjust the electrical signal drive strength based upon the typed speaker.

In the example embodiment, the speaker coil characterization is performed with instructions stored in non-transitory memory and executed on a variety of processing components. For example, an operating system 40 stored in a solid state drive (SSD) 24 includes an audio driver 42 that coordinates speaker identification through coil response to various signal stimuli. Operating system 40 executes on CPU 19, which manages embedded controller 34 and an audio processing resource 46 of audio subsystem 44. When speaker presence sensor 62 detects replacement of speaker 30, audio driver 42 initiates coil characterization to detect the speaker type. Audio processing resource 46 executes speaker characterization instructions 54 to send a direct current signal that determines the coil resistance and a frequency based signal that determines coil impedance. As an example, coil impedance may be determined by scattering parameters (S-parameters) that measure frequency-domain reflection transmission measurements, such as are supported by COILCRAFT at S-parameters for High-frequency Circuit Simulations When to Use S-parameters for High-frequency Circuit Simulations|Coilcraft (https://www-.coilcraft.com/en-us/models/howto/s-parameters-for-high-frequency-circuit-simulation/). A speaker characterization detector 56 detects the speaker response to the characterization currents so that audio processing resource 46 can look up the speaker type identification from speaker type table 52 stored in a flash memory 50. Once the coil electrical signal response characterization is complete, the instructions command audio processing resource 46 to output a predetermined sound signal from audio speaker driver 48. The sound generated from the speaker by the predetermined signal will vary based upon the speaker type so that microphone 58 can capture the sound for comparison to an expected sound from the predetermined signal. In one example embodiment, a speaker type table 52 has a list of speaker types by coil characteristics that define a sound signal to achieve a test sound of a defined quality. In an alternative embodiment, the same audio test signal is sent for each speaker and the speaker type table 52 defines the qualities of the sound expected from the test signal, such as the pitch and volume of the sound. As a result, audio processing resource 46 configures audio speaker 48 to output signals for the detect speaker, such as the gain applied to the audio information.

Figure 3:
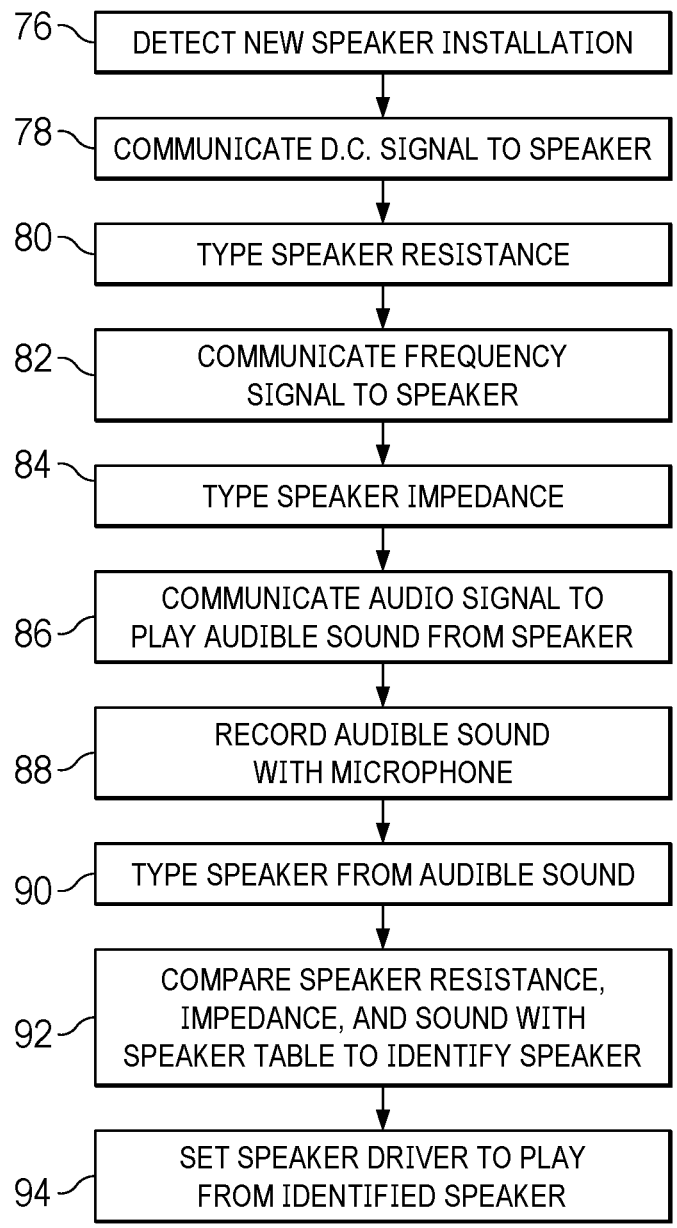
FIG. 3 depicts a flow diagram of a process for speaker type identification from speaker coil response to signal stimuli.

Referring now to FIG. 3, a flow diagram depicts a process for speaker type identification from speaker coil response to signal stimuli. The process starts at step 76 with detection of a new speaker installation, such as by a speaker presence sensor that detects removal and replacement of speaker at a speaker mount. At step 78 the audio processing resource communicates a DC signal to the speaker positive lead to measure current drop and thereby resistance at the speaker negative lead. At step 80 the speaker is typed from the coil resistance, such as by comparing resistance values in a table for available speaker types. At step 82 a frequency signal, such as Sine wave is communicated to the speaker to measure the impedance based upon the returned signal, such as the frequency shift resulting from passage through coil. At step 84 the speaker is typed from the coil impedance, such as by comparing impedance values in a table for the available speaker types. At step 86 an audio signal is communicated to the speaker to generate a sound from the speaker. At step 88 the generated sound is captured by a microphone and compared with an expected sound. At step 90 the speaker type is identified from the audible sound. At step 92 the speaker resistance, impedance and sound response are compared with the speaker table to identify the speaker. At step 94 the speaker driver settings are configured to play for the identified speaker, such as the gain of the audio signal output to the speaker.

Figure 4:
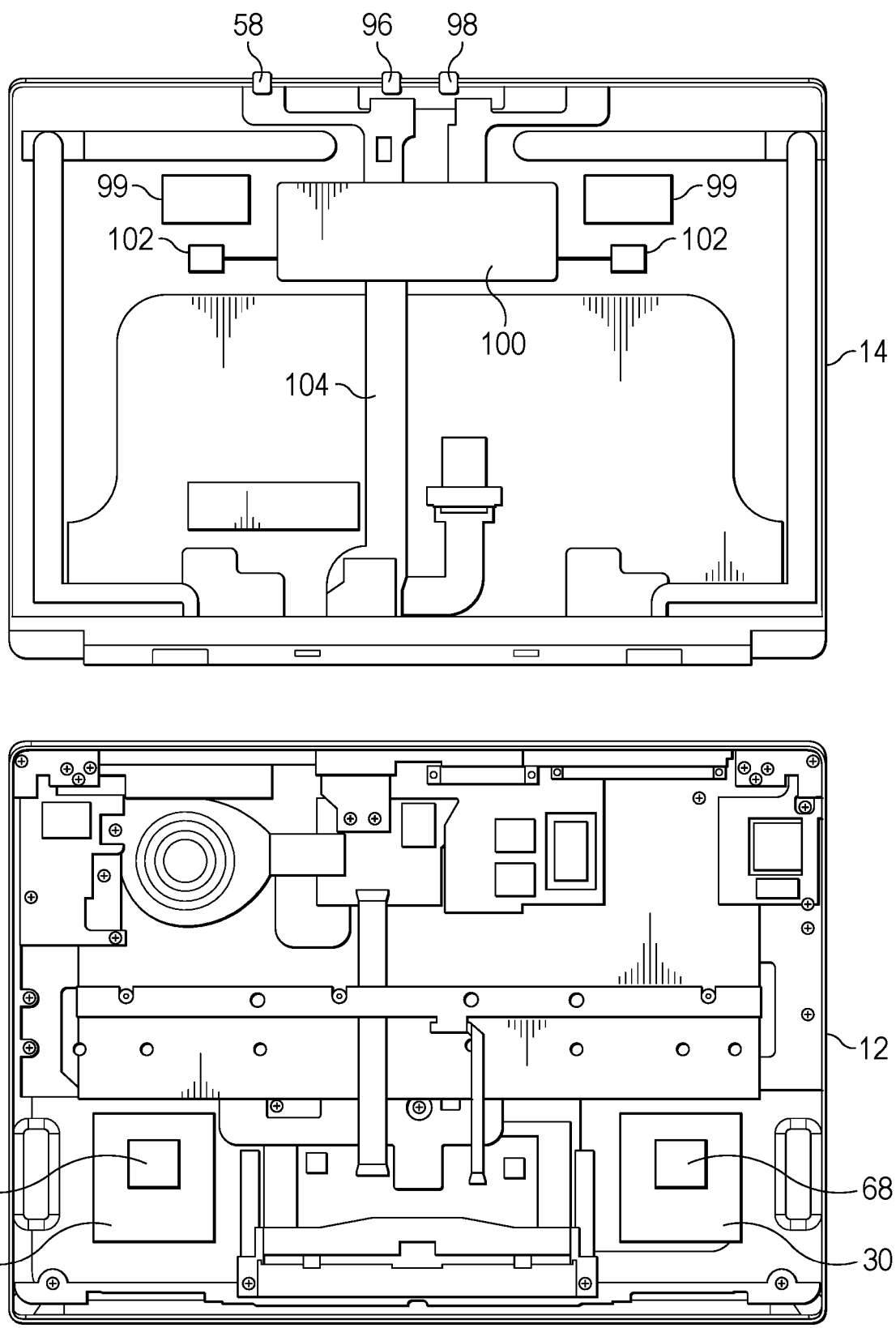
FIG. 4 depicts a top view of a portable information handling system having alignment of a speaker magnet to bias a housing lid portion closed against a housing main portion and detect the housing closed and open positions by interaction of a Hall sensor with the speaker magnet.

Referring now to FIG. 4, a top view of a portable information handling system 10 depicts alignment of a speaker 30 magnet 68 to bias a housing lid portion 14 closed against a housing main portion 12 and detect the housing closed and open positions by interaction of a Hall sensor 102 with the speaker magnet 68. In the example embodiment, housing main portion 12 has first and second speakers 30 on opposing sides, such as positioned to produce audio sound in stereo. Each speaker 30 has a speaker magnet 68 used to generate the audible sound. Housing lid portion 14 has the display removed to show a set of audiovisual components including a microphone 58, a user presence detection (UPD) sensor 96, and a camera 98, which are supported by a camera printed circuit board 100. The camera printed circuit board 100 interfaces with the motherboard and CPU in housing main portion 12 through a flexible printed circuit board communication link 104. As is described above, the lid and main housing portions are rotationally coupled to each other by a hinge to rotate between an open position and a closed position. The open position exposes the display of the housing lid portion and a keyboard coupled over the processing components in the housing main portion. The closed position brings the display of the housing lid portion against the keyboard of the housing main portion so that both the keyboard and display are protected from use.

A ferromagnetic material 99, such as a piece of steel, is coupled on opposing sides of housing lid portion 14 to align with speaker magnets 68 when housing lid portion 14 rotates to a closed position over housing main portion 12. Magnetic attraction of speaker magnets 68 with each aligned piece of ferromagnetic material 99 in the closed position biases the housing lid portion towards the housing main portion to maintain the closed position. A Hall sensor 102 located proximate each piece of ferromagnetic material 99 detects when speaker magnet 68 is in proximity and sends a closed position signal through camera printed circuit board 100 to the embedded controller on the motherboard. The embedded controller applies the closed position signal to perform closed housing logic, such as commanding an ACPI sleep state, and applies an open housing position to perform open housing logic, such as waking the information handling system from the ACPI sleep state. The position of the ferromagnetic material 99 leverages the speaker magnet to bias the housing to a closed position, thus reducing the number of magnets needed for the system yet preventing unintended rotation about the hinge. The amount of ferromagnetic material may be adjusted to generate a desired amount of magnetic attraction, such as biasing closed yet allowing movement to an open position with one finger press up on the housing lid portion.

Figure 5:
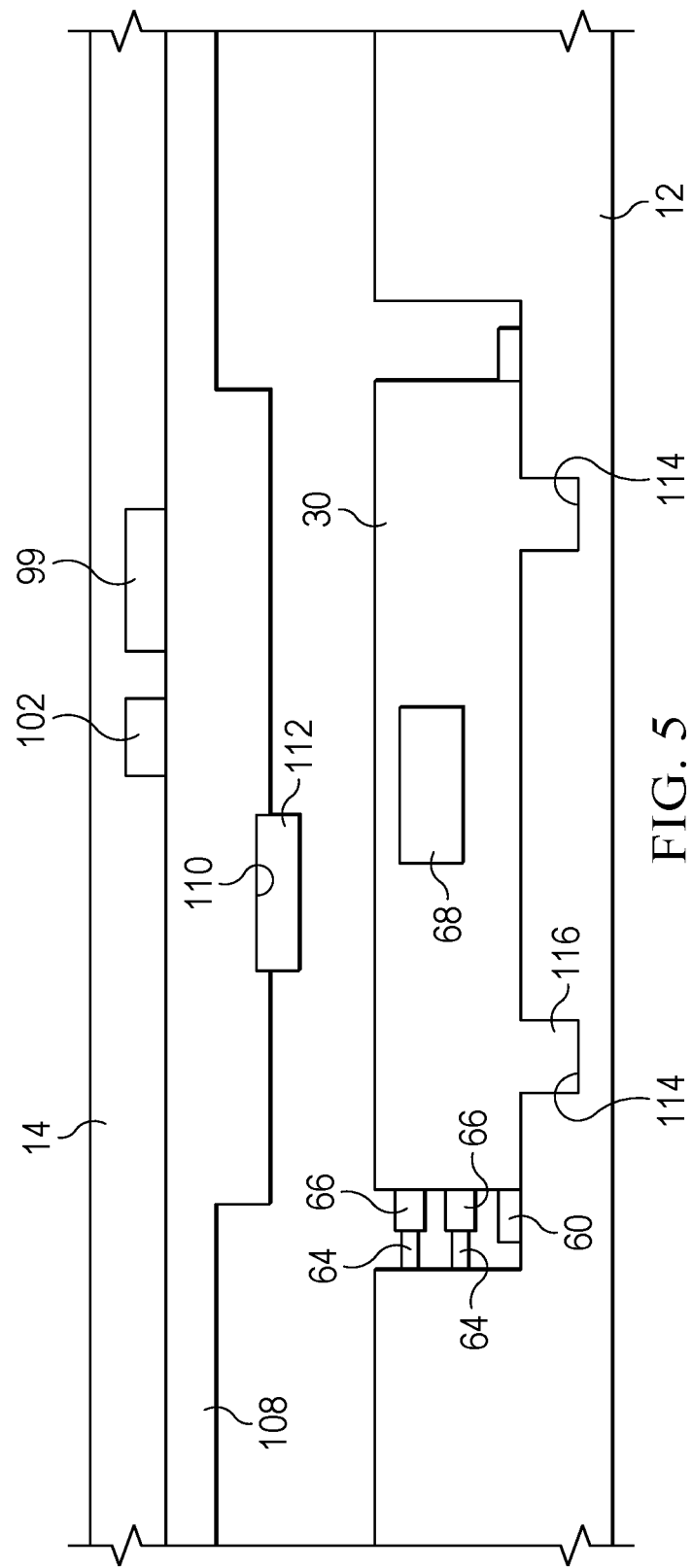
FIG. 5 depicts a side sectional view of a speaker mount that positions a speaker to align the speaker magnet with ferromagnetic material of a housing lid portion and a Hall sensor to detect housing position.

Referring now to FIG. 5, a side sectional view depicts a speaker mount 60 that positions a speaker 30 to align the speaker magnet 68 with ferromagnetic material of a housing lid portion and a Hall sensor to detect housing position. Although interchangeable speakers with the same footprint will fit into speaker mounts of different sized information handling system platforms, in some instances a housing may have a smaller area for the speaker to fit, such as with smaller sized portable systems. If a smaller speaker is fit into a larger platform, some extra room may exist in the speaker mount to adjust the placement of the speaker. The example embodiment depicts a speaker mount 60 with first and second alignment openings 114 that accept an alignment structure 116. The alignment structure and opening ensures alignment of speaker 30 in speaker mount 60 with speaker contacts 66 pressed against speaker contact pins 64 to accept the audio signal and speaker magnet 68 aligned under ferromagnetic piece 99 and Hall sensor 102. In the example embodiment, housing lid portion 14 has rotated to a closed position over housing main portion 12 to cover keyboard 108 and bring ferromagnetic piece 99 and Hall sensor 102 into proximity with speaker magnet 68. In some instances, speaker magnet 68 is too small or is missing, such as when the speaker is not installed. A magnet mount 110 formed in housing main portion 12 accepts an additional magnet 112 to supplement or replace the magnetic attraction provided by speaker magnet 68. In other embodiments, additional magnets may be used in the housing to hold the housing closed at other locations, such as along the perimeter of the front of the housing.

Figure 6:
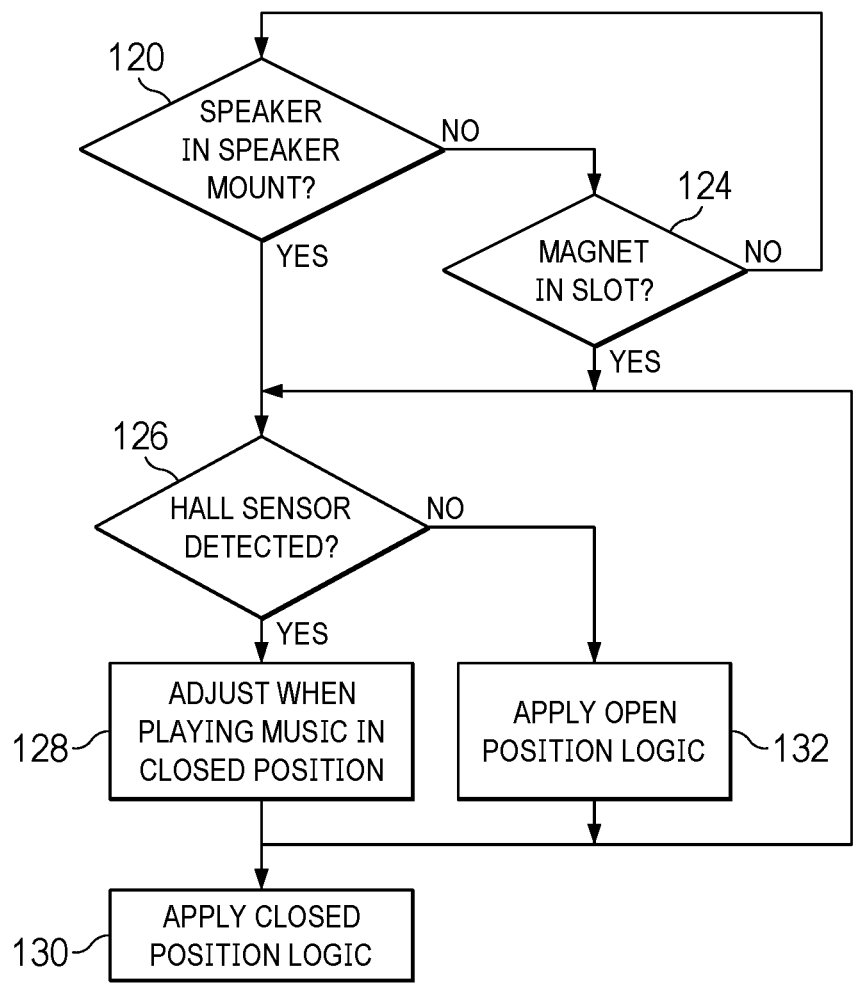
FIG. 6 depicts a flow diagram of a process for detecting housing closed and open positions with a speaker magnet and Hall sensor.

Referring now to FIG. 6, a flow diagram depicts a process for detecting housing closed and open positions with a speaker magnet and Hall sensor. The process starts at step 120 to determine if a speaker is in the mount, such as by checking the speaker presence sensor or determining if an electrical connection exists through the speaker contact. If no speaker is present, the process continues to step 124 to determine if a magnet is mounted in the magnet mount. If not the process returns to step 120 to warn that the closed position cannot be detected. If one or both of the speaker or the magnet mount magnets is present, the process continues to step 126 to determine if the Hall sensor detects the magnet. If the magnet is detected, the process continues to step 128 to adjust audio settings when playing from the speakers in the closed position and, at the initial determination of the closed position, to perform closed position logic at step 130. The process then returns to step 126 to continue monitoring the housing position as open or closed. If at step 126 the Hall sensor does not detect the Hall sensor, the process continues to step 132 to apply the open housing logic and then returns to step 126. As an example, the closed position logic is to apply the ACPI sleep state and the open position logic is to apply the ACPI wake state. In addition, where the open and closed positions impact speaker performance, such as due to changes in the magnetic field, the open and closed positions may adjust the speaker configuration settings.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a main portion and lid portion rotationally coupled by a hinge to rotate between a closed position and an open position;
   a processor disposed in the housing and operable to execute instructions to process information;
   a memory disposed in the housing and interfaced with the processor, the memory operable to store the instructions and information;
   an embedded controller disposed in the housing and interfaced with the processor;
   a speaker coupled in the housing main portion and interfaced with the processor, the speaker having a coil, a magnet and a diaphragm that cooperate to generate audible sounds from the information; and
   a Hall sensor coupled to the housing lid portion and interfaced with the embedded controller, the Hall sensor communicating an open signal when the housing lid portion is distal the speaker and a closed signal when the housing lid portion is proximate the speaker.

2. The information handling system of claim 1 further comprising:
   a ferromagnetic material coupled in the housing lid portion aligned with the speaker magnet to bias the housing lid portion towards a closed position.

3. The information handling system of claim 1 further comprising:
   first and second of the speaker disposed at opposite sides of the housing main portion;
   a first Hall sensor coupled to the housing lid portion aligned with the first speaker first magnet to detect a closed position; and
   a second Hall sensor coupled to the housing lid portion aligned with the second speaker second magnet to detect a closed position.

4. The information handling system of claim 3 further comprising:
   first and second of the ferromagnetic material coupled in the housing lid portion, the first ferromagnetic material aligned with a first magnet of the first speaker, the second ferromagnetic material aligned with a second magnet of the second speaker.

5. The information handling system of claim 1 further comprising a speaker mount coupled to the housing main portion and configured to accept the speaker in a position with the magnet aligned to the Hall sensor.

6. The information handling system of claim 5 further comprising:
a first alignment structure coupled in the speaker mount to align a first speaker of a first type having a first footprint with the magnet aligned to the Hall sensor; and
a second alignment structure coupled in the speaker mount align a second speaker of a second type having a second footprint with the magnet aligned to the Hall sensor.

7. The information handling system of claim 5 further comprising a magnet mount disposed at the speaker mount and configured to accept a magnet that aligns with the Hall sensor.

8. The information handling system of claim 7 further comprising:
a ferromagnetic material coupled to the housing lid portion and aligned with the speaker magnet.

9. The information handling system of claim 8 wherein the magnet mount is configured to hold the magnet simultaneously with a speaker coupled in the speaker mount to cooperatively attract the ferromagnetic material.

10. A method for detecting an information handling system housing closed position, the method comprising:
rotating a housing from an open position to a closed position; and
in response to the rotating, aligning a Hall sensor in a lid portion of the housing with a speaker magnet in a main portion of the housing to detect the closed position with the Hall sensor.

11. The method of claim 10 further comprising:
aligning ferromagnetic material in a lid portion of the housing with the speaker magnet in a main portion of the housing; and
biasing the lid portion towards the main portion in the closed position by magnetic attraction of the speaker magnet to the ferromagnetic material.

12. The method of claim 10 further comprising:
coupling first and second speakers in opposing sides of the main portion;
coupling a first Hall sensor proximate the first ferromagnetic material to detect the first speaker magnet when in the closed position; and
coupling a second Hall sensor proximate the second ferromagnetic material to detect the second speaker magnet when in the closed position.

13. The method of claim 12 further comprising:
coupling a first ferromagnetic material in the lid portion aligned with a magnet of the first speaker; and
coupling a second ferromagnetic material in the lid portion aligned with a magnet of the second speaker.

14. The method of claim 10 further comprising:
coupling a housing cover portion over the main portion;
coupling a magnet mount in the housing cover portion at the speaker magnet location to align with the Hall sensor when the housing is in the closed position.

15. The method of claim 14 further comprising:
coupling a ferromagnetic material in the housing lid portion aligned with the magnet mount; and
biasing the housing lid portion to the closed position with magnetic attraction between the ferromagnetic material and a magnet in the magnet mount.

16. A system for detecting a portable information handling system housing lid portion and main portion closed position, the system comprising:
a speaker coupled in the housing main portion, the speaker having a coil, a magnet and a diaphragm that cooperate to generate audible sounds from information;
an embedded controller disposed in the housing main portion; and
a Hall sensor coupled to the housing lid portion and interfaced with the embedded controller, the Hall sensor communicating an open signal when the housing lid portion is distal the speaker and a closed signal when the housing lid portion is proximate the speaker.

17. The system of claim 16 further comprising:
a ferromagnetic material coupled in the housing lid portion aligned with the speaker magnet to bias the housing lid portion towards the main portion in a closed position.

18. The system of claim 16 further comprising:
first and second of the speaker disposed at opposite sides of the housing main portion; and
first and second of the Hall sensor coupled in the housing lid portion, the first Hall sensor aligned with a first magnet of the first speaker to detect the closed position, the second Hall sensor aligned with a second magnet of the second speaker to detect the closed position.

19. The system of claim 18 comprising:
first and second of the ferromagnetic material coupled in the housing lid portion, the first ferromagnetic material aligned with the first magnet of the first speaker, the second ferromagnetic material aligned with the second magnet of the second speaker.

20. The system of claim 19 further comprising a speaker mount coupled to the housing main portion and configured to accept the speaker in a position with the magnet aligned to the ferromagnetic material.

* * * * *